US012548936B2

(12) United States Patent
Pacher et al.

(10) Patent No.: US 12,548,936 B2
(45) Date of Patent: Feb. 10, 2026

(54) ELECTRICAL CONNECTOR WITH A SECONDARY LOCKING DEVICE

(71) Applicant: Aptiv Technologies AG, Schaffhausen (CH)

(72) Inventors: Franz Pacher, Roth (DE); Prasanna Ramakrishnan, Chennai (IN); Reinhard Hinteregger, Bad Kleinkirchheim (AT)

(73) Assignee: Aptiv Technologies AG, Schaffhausen (CH)

( * ) Notice: Subject to any disclaimer, the term of this patent is extended or adjusted under 35 U.S.C. 154(b) by 987 days.

(21) Appl. No.: 17/673,274

(22) Filed: Feb. 16, 2022

(65) Prior Publication Data

US 2022/0278473 A1 Sep. 1, 2022

(30) Foreign Application Priority Data

Feb. 26, 2021 (GB) ..................................... 2102790

(51) Int. Cl.
*H01R 13/426* (2006.01)
*H01R 11/12* (2006.01)
*H01R 43/20* (2006.01)

(52) U.S. Cl.
CPC ........... *H01R 13/426* (2013.01); *H01R 11/12* (2013.01); *H01R 43/20* (2013.01); *H01R 2201/26* (2013.01)

(58) Field of Classification Search
CPC ...... H01R 13/426; H01R 11/12; H01R 43/20; H01R 2201/26; H01R 11/281;
(Continued)

(56) References Cited

U.S. PATENT DOCUMENTS 10,381,752 B2 * 8/2019 Kaehny .................. H01R 11/11
10,461,457 B1 * 10/2019 Aono ................ H01R 13/4223
10,892,579 B2 * 1/2021 Demaratos ............ H01R 43/20

FOREIGN PATENT DOCUMENTS

DE 102011087243 B3 3/2013
DE 112014005519 T5 10/2016
(Continued)

OTHER PUBLICATIONS

Combined Search and Examiner Report for Application No. GB2102790.9 mailed Nov. 25, 2021.

*Primary Examiner* — Briggitte R. Hammond
(74) *Attorney, Agent, or Firm* — Billion & Armitage

(57) ABSTRACT

A electrical connector comprises a housing defining a receiving space, and a first opening in communication with the receiving space and configured for receiving a first electrical terminal. The housing includes a primary locking device configured to secure the first electrical terminal at a defined position within the receiving space, and a secondary locking device includes one or more locking elements. The secondary locking device is located within the receiving space and configured to be moveable between a pre-locked condition and a locked condition. In the pre-locked condition, the secondary locking device and the housing are configured to permit the first electrical terminal to move into, or out of, the defined position. In the locked condition, the one or more locking elements of the secondary locking device are configured to lock the first electrical terminal in the defined position.

24 Claims, 9 Drawing Sheets

(58) Field of Classification Search
CPC .............. H01R 13/5213; H01R 13/447; H01R 13/4532; H01R 13/52
See application file for complete search history.

(56) References Cited

FOREIGN PATENT DOCUMENTS

| | | | |
|---|---|---|---|
| DE | 202018100111 | U1 | 9/2018 |
| DE | 112018006109 | T5 | 8/2020 |
| EP | 0803936 | A2 | 10/1997 |
| EP | 3249756 | A1 | 11/2017 |

* cited by examiner

ELECTRICAL CONNECTOR WITH A SECONDARY LOCKING DEVICE

CROSS-REFERENCE TO RELATED APPLICATIONS

This application claims priority to UK Patent Application No. GB2102790.9 filed on Feb. 26, 2021.

TECHNICAL FIELD

The present application relates to an electrical connector that is configured to facilitate the coupling of electrical terminals in a secure manner, and more in particular, to an electrical connector with primary and secondary locking devices configured to lock an electrical terminal at a defined position within a receiving space of the electrical connector that is well suited for high-voltage automotive application.

BACKGROUND

Electrical connectors, such as those used in the automotive industry, are usually provided with a connector housing for protecting the electrical connections provided therein. In automotive applications, electrical connectors play an important role in the vehicle electrical system. Typically, the different electrical components of a vehicle are installed and connected via a cable harness. The electrical connection between the cable harness and the individual electronic components is achieved by means of electrical connectors.

Conventionally vehicle electrical systems are powered with 12 V. However, with increasing automation, modern vehicles have higher energy consumption requirements. Therefore, the operating voltage of modern electrical systems can be 48 V or even higher. As such, higher amounts of energy can be transferred to facilitate the operation of the different electrical systems in a modern vehicle, while maintaining the current at reasonable low levels. However, the transmission of higher amounts of energy requires an increase in the cross-sectional thickness of cabling, which affects the electrical connector space requirements, which also need to be increased. Angled connectors are provided to reduce the space requirements by allowing, e.g. a 90° connection. Such 90° electrical connectors are provided with electrical contact terminals secured at a defined positioned within the electrical connector, which are typically crimped onto the cable or screwed on corresponding electrical contact interfaces. The angled connectors are provided with an opening to facilitate access to the screwed and/or crimped terminals, and the opening is configured to be sealingly closed after facilitating the connection of the electrical terminal to the cable. EP3249756A1 describes an example of an electrical connector assembly for facilitating high voltage electrical connections with a cable or an electrical contact interface. Such high-voltage connectors are provided with snap-fittings on the housing to secure the electrical contact terminal in the defined position. However, snap-fittings provide a limited securing force and if the securing force of the snap-fittings is increased, a larger force is required to force the electrical contact terminal into the defined position within the electrical connector. The larger forces result in difficulty using the electrical connector and risks damage to the electrical contact terminal and/or connector housing.

As such there is a need to provide an improved electrical connector for maintaining the electrical terminal in the defined position.

SUMMARY

It is an aim of the present disclosure to provide an electrical connector that securely retains an electrical terminal at a defined position to facilitate coupling with a counter electrical terminal and improve the security of the coupling.

According to a first aspect of the present disclosure, an electrical connector is provided, comprising: a housing defining: a receiving space; and a first opening, in communication with the receiving space, for receiving a first electrical terminal; and comprising a primary locking device configured to secure the first electrical terminal at a defined position within the receiving space; and a secondary locking device comprising one or more locking elements; wherein the secondary locking device is mounted within the receiving space and configured to be moveable between a pre-locked condition and a locked condition; and wherein: when the secondary locking device is moved to the locked condition and the first electrical terminal is secured at the defined position by the primary locking device, the one or more locking elements of the secondary locking device are configured to lock the first electrical terminal in the defined position.

An advantage of the present disclosure is that the secondary locking device serves to increase the retaining force with which the first electrical terminal is retained in the defined position. This prevents the first electrical terminal being unintentionally pulled out of position, which can damage the coupling of the terminals. The increased force is provided once the secondary locking device is moved to the locked condition. Therefore, there is no additional effort required to move the first terminal into the defined position.

According to embodiments of the present disclosure, the one or more locking elements comprise one or more engaging protrusions that are configured, when the secondary locking device is in the locked condition and the first electrical terminal is in the defined position, to engage with the first electrical terminal. The additional of the one or more engaging protrusions provides a second lock operating separately to the first lock provided by the primary locking device. The second lock providing an independent retaining force. Further, as the second lock is located at a different location to the primary locking device, the second lock helps to ensure the first terminal is at the correct orientation as well as location. Since the second lock is also formed separately to the primary locking device and on a different component, manufacturing errors are less likely to adversely affect the locking of the first electrical terminal in the defined position. For example, if the retaining force of the primary locking device is slightly reduced due to a manufacturing error in the connector hosting, the second lock will still ensure the first terminal is secured in the defined position with sufficient force.

According to embodiments of the present disclosure, the one or more locking elements comprise one or more blocking protrusions; the primary locking device is biased in a blocking configuration that retains the first electrical terminal in the defined position; and the secondary locking device is configured so that, when the secondary locking device is in the locked condition, the one or more blocking protrusions engage the primary locking device to maintain the primary locking device in the blocking configuration.

The synergistic operation of the secondary locking device with the primary locking device increases the retaining force of the primary locking device without increasing the force needed to move the first electrical terminal into the defined position. When engaged with the primary locking device, the one or more blocking protrusions increase the retaining force of the primary locking device.

When the secondary locking device comprises one or more engaging protrusions and one or more blocking protrusions, the combined effect of the secondary locking device is to increase the retaining force of the first lock and to add an additional second lock that acts directly on the first electrical terminal.

According to embodiments of the present disclosure, the secondary locking device comprises a pre-lock catch and the housing comprises a pre-lock receptacle; and the pre-lock catch and the pre-lock receptacle are configured to engage to retain the secondary locking device in the pre-locked condition.

The secondary locking device can be coupled to the housing in a pre-locked condition. As such, the connector can be supplied with the secondary locking device coupled i.e. with the connector assembled. Consequentially, there is no risk of a user forgetting to add a locking device, and the coupling process is not disrupted by the need to install a locking device.

According to embodiments of the present disclosure, the connector comprises one or more guiding features configured to limit the possible motion of the secondary locking device to a non-rotating translation. Such a guiding feature may comprise a rib on the housing and a slot in the secondary locking device that receives the rib.

The one or more guiding features serve to ensure the secondary locking device does not rotate into position where its features do not operate as intended. Essentially the one or more guiding features guide the secondary locking device into the pre-locked or locked condition, making the connector easier to assemble and use.

According to embodiments of the present disclosure, the secondary locking device comprises a final catch and housing comprises a final receptacle; and the final catch and the final receptacle are configured to engage to retain the secondary locking device in the locked condition.

The final catch and final receptacle cooperate to securely retain the secondary locking device in the locked condition preventing the secondary locking device shaking out of the locking condition. Additionally, they cause a haptic sensation as the secondary locking device is pressed into the locked condition that lets a user confirm the first electrical terminal is secured in the defined position even if the user cannot see the first electrical terminal.

According to embodiments of the present disclosure, the secondary locking device defines a cylinder, the cylinder having a first end and a second end opposite the first end, the first end being configured to engage with the first electrical terminal and the second end comprising a feature to indicate the rotational alignment of the locking device.

This allows a user to check the secondary locking device is in the correct orientation before the secondary locking device is pressed into the housing to assemble the connector. As such it becomes easier to align the one or more guiding features, thereby preventing the secondary locking device from being accidentally pressed into the housing in a wrong orientation, in which it would not function as intended.

According to embodiments of the present disclosure, the first terminal is a ring terminal and the second terminal is an electrical post for coupling with the ring terminal.

The above features are particularly suited for these terminals as the coupling of such terminals is assisted when the ring terminal is in a defined position because this ensures the electrical post passes through the ring terminal without damaging either terminal. However, other types of electrical terminals may be coupled using the secondary locking device e.g., fork terminals.

According to embodiments of the present disclosure, the connector is configured for automotive use and/or an operational voltage of 48 volts.

According to embodiments of the present disclosure, the connector further comprises a cover configured to cooperate with the housing and at least partially seal the receiving space.

Access to terminals in automotive environment is often limited and it is important to protect said terminals. Connectors therefore are of use in forming coupling. High-voltage connections require to be maintained clean and secure to prevent sparking and ensure connectivity. A cover assists in protecting the coupled electrical terminals from damage and exposure to detritus or fluids. Nearby components are also protected from the electricity and/or heat of the coupled electrical terminals.

According to embodiments of the present disclosure, the secondary locking device defines a cylinder with an axis of rotation, and the secondary locking device is symmetric in two orthogonal planes, the axis of rotation being parallel to both planes.

The symmetry of the secondary locking device means it can be installed, during assembly of the connector in two directions (differing by a 180° rotation around the axis of rotation). This facilitates assembly. Additionally, the symmetry of the component means it is easier to manufacture.

According to embodiments of the present disclosure, the electrical connector is an angled connector assembly having an angle of 45° to 135°, preferably of 60° to 120°, and most preferably of 90°.

According to embodiments of the present disclosure, wherein the housing comprises a first portion and a second portion positioned at an angle to one another.

According to embodiments of the present disclosure, the first portion is positioned perpendicular to the second portion.

The electrical connector assembly is an angled connector assembly and as such can facilitate connections with counter connectors positioned at different angles. For example, the electrical connector assembly may define a female electrical connector configured to be coupled to a male counter connectors.

According to embodiments of the present disclosure, the first portion defines the first opening and the second portion defines, at opposing ends, a second opening and a third opening, the first, second, and third openings being in communication with a receiving space of the housing.

According to embodiments of the present disclosure, the third opening of the housing is arranged to allow access to an electrical terminal being arranged within the receiving space of the housing.

According to embodiments of the present disclosure, the electrical connector is a female electrical connector configured to receive though the third opening opening an electrical terminal of a counter electrical connector to facilitate coupling with the electrical terminal arranged within the receiving space of the housing.

According to embodiments of the present disclosure, the first and second portions of the housing are cylindrical such that each of the first, second and third openings is a circular opening. The openings of the connector housing may be cylindrical, although the openings may be provided in any desired shape.

According to embodiments of the present disclosure, the cover comprises a circular portion configured to sealingly cover the second opening. The cover portion arranged to cover the opening may be shaped and dimensioned according to the shape and dimensions of the third opening so as to provide the desired sealing functionality.

According to another aspect of the present disclosure an electrical connector assembly is provided comprising: an electrical connector according to any one of the embodiments of the first aspect; and a first electrical terminal secured in a defined position within the receiving space of the electrical connector by the primary locking device; wherein, when the secondary locking device moved from the pre-locked condition to the locked condition, one or more locking elements of the secondary locking device are configured to cooperate with corresponding engagement features of the first electrical terminal to lock the first electrical terminal in the defined position.

According to another aspect of the present disclosure, there is a method of locking a first electrical terminal (2) at a defined position within an electrical connector (1). The method comprises: retaining a secondary locking device in a pre-locked condition within a receiving space defined by a housing of the connector; receiving the first electrical terminal into the receiving space through a first opening in the housing; engaging a primary locking device on the housing with the first electrical terminal to secure the first electrical terminal at a defined position; moving the secondary locking device from the pre-locked condition to a locked condition so that one or more locking element of the secondary locking device lock the first electrical terminal in the defined position; and securing the secondary locking device in the locked position.

The advantages of the disclosed methods are the same as the advantages described above in relation to the equivalent features on the connectors.

According to embodiments of the above method, moving the secondary locking device from the pre-locked condition to the locked condition comprises engaging one or more engaging protrusions on the secondary locking device with the first electrical terminal.

According to embodiments of the above methods, the primary locking device is biased in a blocking configuration that retains the first electrical terminal in the defined position; and moving the secondary locking device from the pre-locked condition to the locked condition comprises engaging the primary locking device with one or more blocking protrusion on the secondary locking device to prevent the primary locking device transitioning from the blocking configuration.

According to embodiments of the above methods, retaining the secondary locking device in the pre-locked condition within a receiving space comprises the step of; pressing a pre-lock catch of the secondary locking device past a pre-lock receptacle of the housing.

According to embodiments of the above methods, securing the secondary locking device comprises the step of pressing a final catch of the secondary locking device past a final receptacle of the housing.

BRIEF DESCRIPTION OF THE DRAWINGS

Embodiments of the present disclosure will now be described, by way of example, with reference to the accompanying drawings, in which.

DETAILED DESCRIPTION

Figure 1:
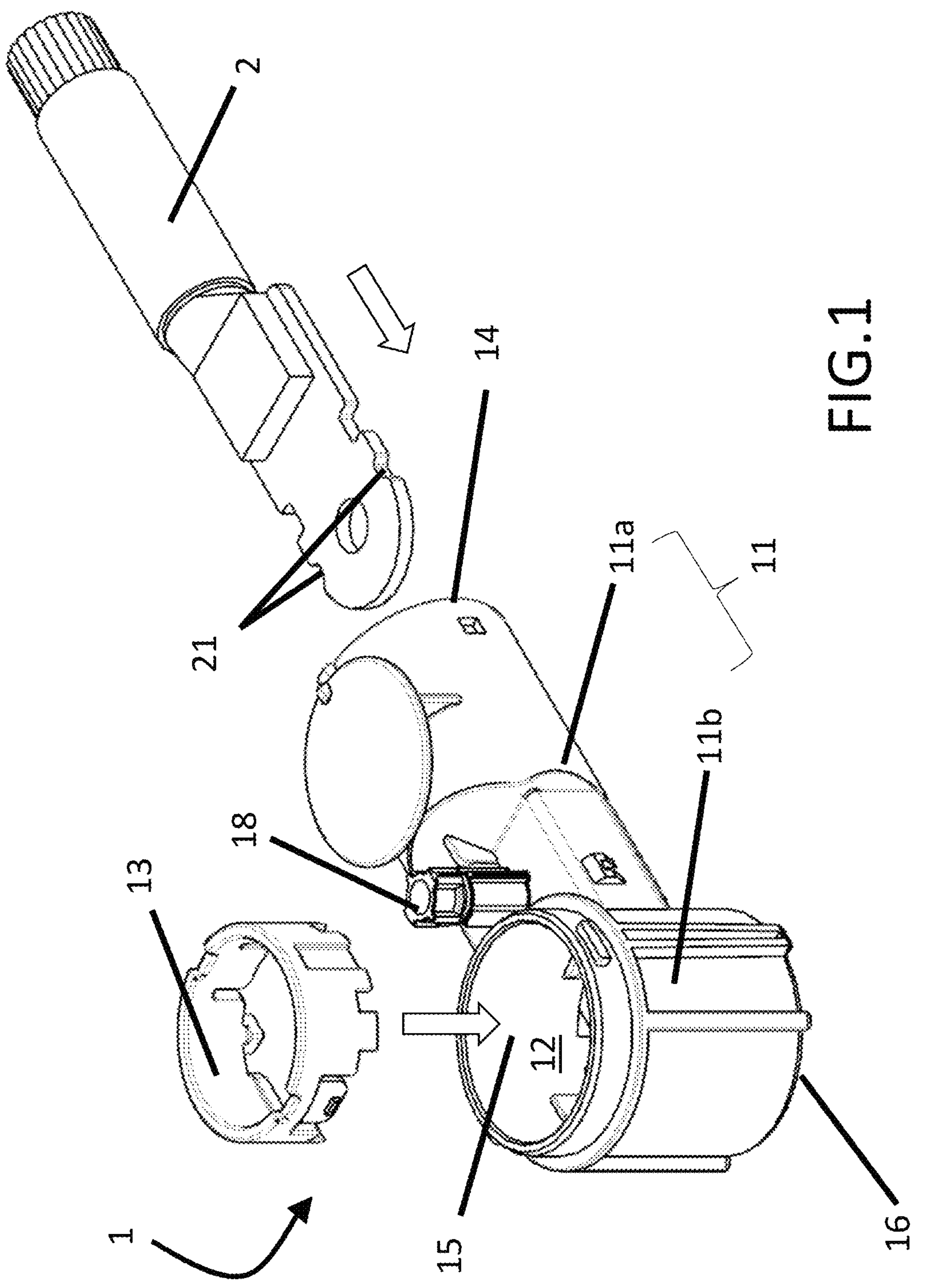
FIG. 1 shows an exploded view of a connector and a first electrical terminal, according to embodiments of the present disclosure.

FIG. 1 show an electrical connector 1 and an electrical terminal 2. The connector 1 has a housing 11 that defines a receiving space 12. The receiving space 12 is configured to receive and couple two electrical terminals. The housing 11 defines a first opening 14, a second opening 15 and a third opening 16. Each opening is configured to define a passageway into the receiving space 12.

The electrical connector 1 is configured to facilitate a high-voltage electrical connection with a counter-electrical connector e.g. 48V. For example, the first opening 14 is configured for receiving the electrical terminal 2, and the third opening 16 for receiving a counter electrical terminal. The electrical terminal 2 may be in the form of a ring terminal, which is configured to be coupled to an electrical terminal of a counter connector. The coupling of the electrical terminal and the counter electrical terminal may be facilitated through the second opening 15 of the connector housing 11. For example, though the second opening 15, the electrical terminals may be crimped, or screwed to one another. It should be noted that the electrical connector housing 11 may be adapted according to the requirements of the intended application and may be provided with fewer or more openings as necessary. The connector 1 is an angled connector 1, having an angle of 45° to 135°, preferably of 60° to 120°, and most preferably of 90°. For example, the connector housing 11 is provided with a first portion 11*a*, which is positioned at a desired angle with respect to a second portion 11*b* to form the angled connector 1. The first portion 11*a* may be provided with the first opening 14, while the second portion 11*b* may be provided at opposing ends with the second and third openings 15, 16, as shown in FIG. 1. The electrical connector 1 may be a female connector configured to receive through the third opening 16 an electrical terminal of a counter connector. As shown in FIG. 1, the electrical terminal 2 is inserted into the receiving space 12 of the housing 11 along a first axis with respect to the connector housing 11, as indicated by the direction of the arrow e.g. along a longitudinal axis. The secondary locking device 13 is configured to move from the pre-locked condition to the locked condition along a second axis, as indicated by the direction of the arrow, which is angled to the first axis. For example, the secondary locking device 13 may be configured to move between the pre-locked and locked conditions along a vertical axis, which is orthogonal to the first axis.

The first opening 14 is shaped and sized so that the first electrical terminal 2 can move through into the receiving space 12.

The second opening 15 and third opening 16 combine to define a common passageway that extends through the connector 1 via the receiving space 12. The third opening 16 is shaped and sized so that a second electrical connector 2 can be moved through into the receiving space 12. The passageway defined by the third opening 16 is narrower than the passageway defined by the second opening 15.

The connector 1 also comprises a secondary locking device 13. FIG. 1 shows the connector 1 in a disassembled state in which the secondary locking device 13 is separated from and outside the receiving space 12. The connector 1 may be provided either in the disassembled state or in an assembled state in which the secondary locking device 13 is coupled to the housing 11 and is within the receiving space 12.

If disassembled, before use, the connector 1 is assembled by pressing the secondary locking device 13 into the receiving space 12, engaging a pre-lock to couple the secondary locking device 13 with the housing 11. The coupled secondary locking device 13 is held in a pre-locked condition by the pre-lock. In use, a first electrical terminal 2 is placed through the first opening 14 and into a defined position within the receiving space 12. The housing 11 comprises a primary locking device 112 that secures the first electrical terminal 2 in the defined position. The secondary locking device 13 is then transitioning from the pre-locked condition into the locked condition. In the locked condition, the secondary locking device 13 is engaged with the housing 11 to further secure the first electrical terminal 2 in the defined position. The various locks of the connector and their operation are described in more detail below.

A second electrical terminal is then placed through the third opening 16 and into engagement with the first electrical terminal 2 in the defined position. The first and second electrical terminals are then coupled together to complete the connection. The coupling of the electrical terminals may be done by hand or be using a tool. For example, if the first electrical terminal is a ring terminal and the second electrical terminal a threaded electrical post, the ring terminal can be placed over the threaded electrical post and a nut driver used to rotate a nut onto the threaded electrical post thereby securely coupling the terminals.

An optional final cover may be used to at least partially seal the receiving space 12 and protect the coupled electrical terminals.

By supporting the first electrical terminal 2 in the defined position, the coupling of the electrical terminals is facilitated. For example, for the case of the first electrical terminal 2 being a ring terminal and the second electrical terminal an electrical post, supporting the ring terminal in the defined position will centre the aperture in the ring terminal within the connector making it easier to insert the post terminal into the connector through the ring terminal.

Embodiments of the connector 1 are formed or comprise the appropriate one or more materials for their respective applications and the electrical terminals with which they are envisaged to operate. As an example, in automotive applications, which are often at risk of liquid contamination, the connector may be formed out of plastic. The appropriate material for the connector will also take into account the nature of the connection formed within the connector. For example, if the electrical terminals are high-voltage the appropriate material will be electrical insulating. In this context, high-voltage may be considered as any voltage over 12 volts e.g., over 24 volts, or over 48 volts.

Figure 2B:
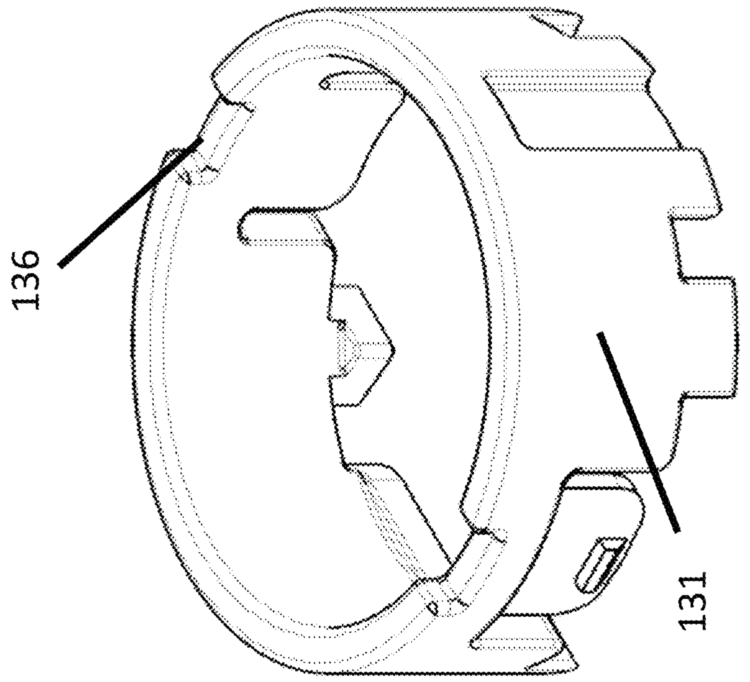
FIGS. 2*a* and 2*b* shows a secondary locking device of the connector of FIG. 1, according to an embodiment of the present disclosure.
Figure 2A:
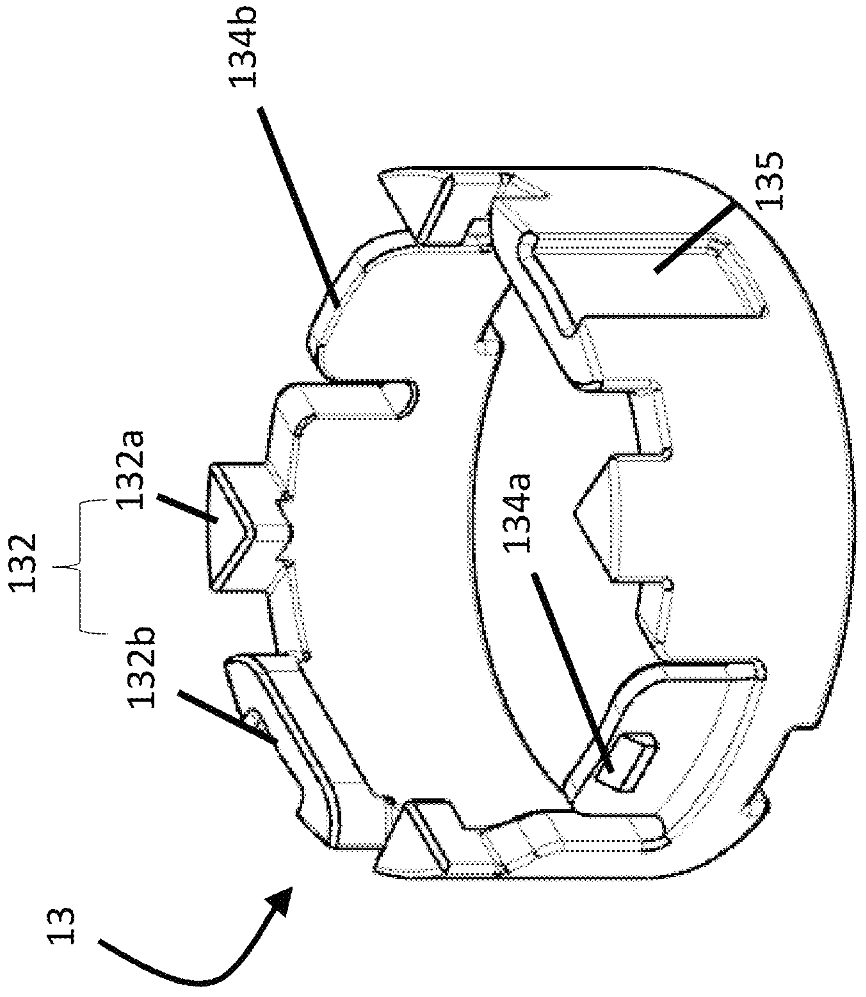

FIGS. 2*a* and 2*b* show details of the secondary locking device 13. The secondary locking device 13 comprises a boundary wall 131 that defines a hollow cylinder with a first end and a second end opposite the first end. The locking devices has two planes of symmetry that are perpendicular to each other. This symmetry simplifies manufacturing.

At the first end of the secondary locking device 13 there are multiple protrusions. When the secondary locking device 13 is in the locking condition, the multiple protrusions secure the first electrical terminal 2 in the defined position. The multiple protrusions comprise terminal engaging protrusions 132*a* that are equally distributed around the boundary wall 131 of the secondary locking device 13. The multiple protrusions also comprise two blocking protrusions 132*b*. The number of engaging protrusions and blocking protrusions and their positioning varies in other embodiments. Some embodiments have no engaging protrusions and other embodiments have no blocking protrusions.

The secondary locking device 13 further comprises a pre-lock catch 134*a* and a final lock catch 134*b*. The pre-lock catch 134*a* is a radial protrusion that is biased radially outward. The final lock catch 134*b* is the mirror image of the pre-lock catch 134*a*.

The secondary locking device 13 comprises open ended slots 135 to facilitate the assembly of the connector 1 and the transition of the secondary locking device 13 between the pre-locked condition and locked condition. The slots 135 run in a direction from the first end to the second end. The slots 135 interact with the housing to block rotation of the locking device.

At the second end of the secondary locking device 13 there is a radially orientated indentation 136. The indentation 136 serves to indicate the rotational alignment of the secondary locking device 13. As the secondary locking device 13 is cylindrical, without this indentation 136 to provide a visual alignment feature it would be difficult to ensure the secondary locking device 13 had the correct rotational alignment when the connector 1 is being assembled.

Figure 3A:
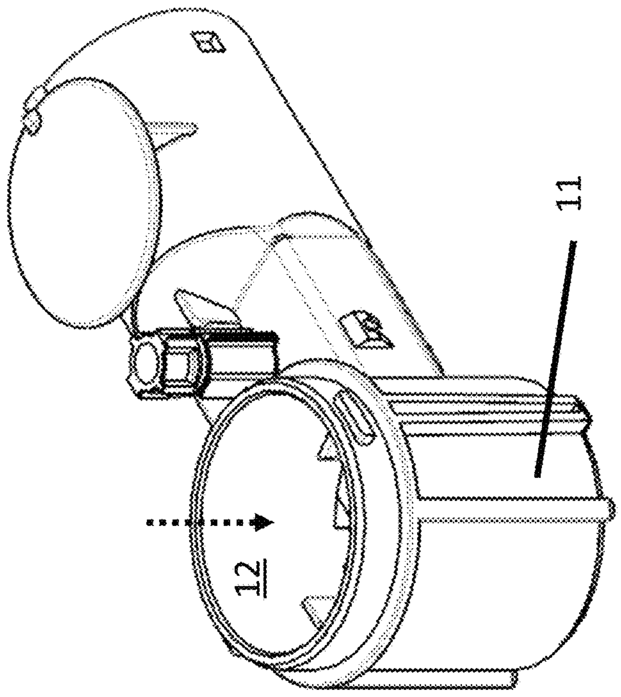
FIG. 3*a* shows the connector of FIG. 1 before insertion of a locking device.
Figure 3B:
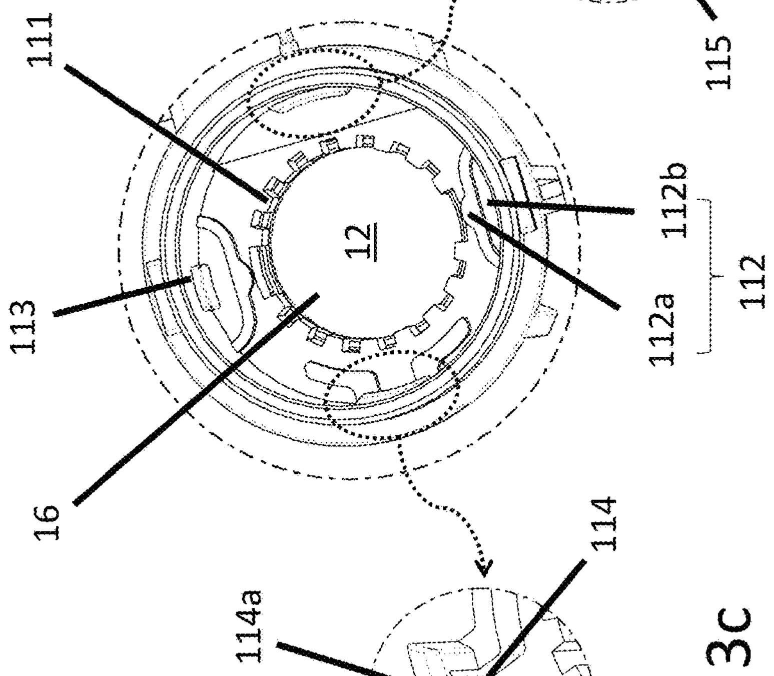
FIGS. 3*b*-3*d* show details of a housing of the connector in FIG. 3*a*, according to an embodiment of the present disclosure.
Figure 3C:
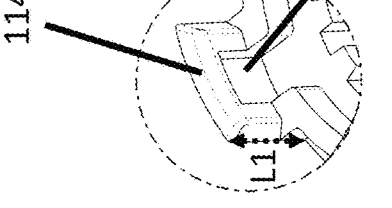
Figure 3D:
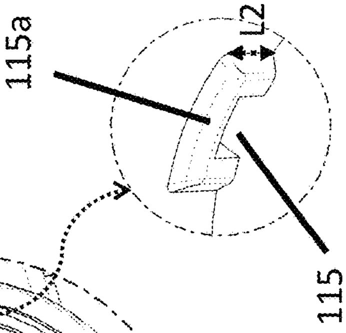

FIG. 3*b* is a view looking into the housing 11, through the second opening 15, in the direction of the dashed arrowed line in FIG. 3*a*. FIGS. 3*c* and 3*d* show more details about the housing 11 of the connector 1 illustrated in FIG. 3*b*.

In the example shown in FIG. 3*b*, the passageway defined by the third opening 16 is in the form of a cylindrical wall for engaging with an electrical post terminal (not shown). Part of the cylinder wall has a series of slots 111 to facilitate engagement. In other examples, the passageway defined by the third opening 16 is configured to operate with electrical terminal of other forms.

The housing 11 also comprises the primary locking device. The primary locking device can take any form that engages with the first electrical terminal 2 and secures it in a defined position. In FIGS. 3*b* to 3*d*, the primary locking device 112 comprises two housing catches 112*a*. The housing catches 112*a* are biased in a blocking configuration that prevents the first electrical terminal 2 from entering, or leaving, the defined position. However, if sufficient force it used, the biasing of the housing catches 112*a* can be overcome by forcing the housing catches 112*a* into catch voids 112*b*. The first electrical terminal 2 therefore be pressed or pulled into or out of the defined position.

When the first electrical terminal 2 is in the defined position, the housing catches 112*a* may be received in notches 21 that help maintain the first electrical terminal 2 in the defined position. However, even without the notches 21, the housing catches 112*a* will still press against an inserted electrical terminal and maintain it in the defined position.

The housing 11 also comprises ribs 113 extending along the passageway defined by the second opening 15. Each rib is configured to interact with a corresponding slot on the secondary locking device 13. When the connector 1 is assembled, the slots 135 on the secondary locking device are aligned with the ribs 113. Once assembled, the ribs 113 and slots 135 on the secondary locking device 13 prevent rotation of the secondary locking device 13 relative to the housing 11. Instead, the secondary locking device 13 is limited to sliding in the direction of the passageway defined by the second opening 15. In other embodiments, the ribs and slots can be replaced by different gliding features that serve to prevent rotation of the secondary locking device 13 relative to the housing 11.

The housing 11 further comprises a pre-lock receptacle 114 with a surrounding edge 114*a*. During assembly, the pre-lock catch 134*a* of the secondary locking device 13 is pressed past the surrounding edge 114*a* and into the pre-lock receptacle 114. The pre-lock catch 134*a* is then retained in the pre-lock receptacle 114. The secondary locking device 13 is then in the pre-locked condition.

When the secondary locking device 13 is in the pre-locked condition, the secondary locking device 13 can slide within a range of positions up to the locked condition. For at least part of this range, the secondary locking device 13 does not block the first electrical terminal 2 moving into, or out of, the defined position. Therefore, when the secondary locking device 13 is in the pre-locked condition, the first electrical terminal 2 can be pressed into the defined position where it is secured by the housing catches 112*a*. If necessary, whilst secondary locking device is in the pre-locked condition, the first electrical terminal 2 can be pulled out of the defined position by pulling with a force that overcomes the securing force of the housing catches 112*a*.

The housing 11 further comprises a final receptacle 115 with a surrounding edge 115*a*. To lock a first electrical terminal 2 onto the connector 1, the final catch 134*b* of the secondary locking device 13 is pressed past the surrounding edge 115*a* and into the final receptacle 115. The final catch 134*b* is then retained in the final receptacle 115 retaining the secondary locking device 13 in the locked condition.

When the secondary locking device 13 is in the locked condition, the secondary locking device 13 engages with the housing 11 and/or first electrical terminal 2 to further secure the first electrical terminal 2 in the defined position. The additional force from the secondary locking device 13 prevents the first electrical terminal 2 being pulled out of the defined position. In some embodiments, when the secondary locking device 13 is in the locked condition, a force of 500 Newtons or more is required to pull the first electrical terminal 2 out of the defined position.

As shown in FIGS. 3*b* to 3*d*, the pre-lock receptacle 114 and surrounding edge 114*a* are at a different location in the housing (L1>L2) to the final receptacle 115 with a surrounding edge 115*a*. This is because, in use, the pre-lock condition occurs before the locked condition. Consequently, as the secondary locking device 13 is pressed into the housing 11 it first enters the pre-lock condition. Only, if the secondary locking device 13 is then pressed further into the housing 11 will it enter the locked condition.

The pre-lock receptacle 114 and the pre-lock catch 134*a* form the pre-lock, and the final receptacle 115 and the final catch 134*b* form the final lock. In other embodiments, the pre-lock and/or final lock can be replaced by other locking means providing the same functionality.

The assembly of the connector 1 and the use of the connector 1 will now be explained by reference to FIGS. 4 to 9*b*.

Figure 4:
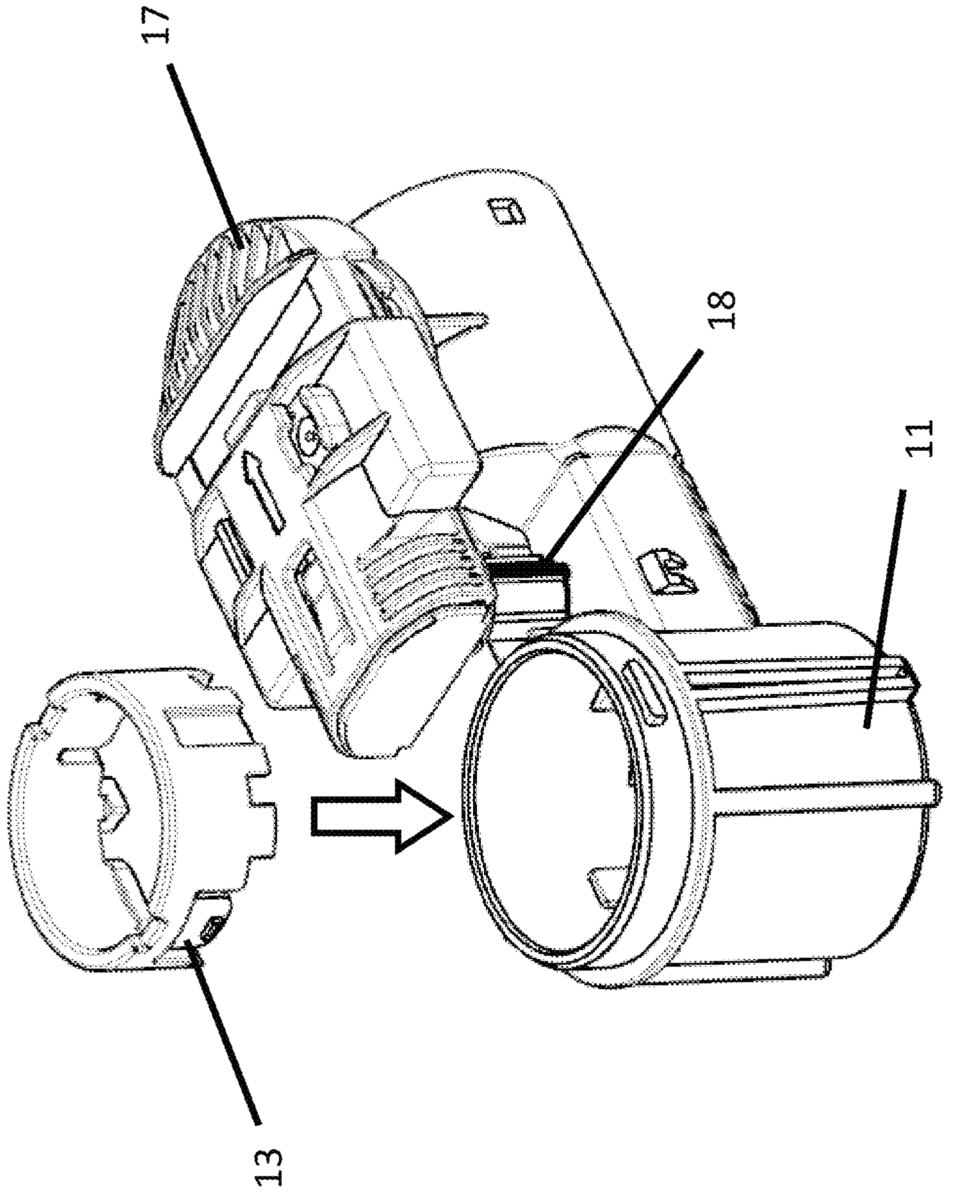
FIG. 4 shows the installation of a secondary locking device within the connector housing of the electrical connector of FIG. 1 according to embodiments of the present disclosure.

FIG. 4 shows the insertion of the secondary locking device 13 in the connector 1. The connector 1 shown in FIG. 4 has a cover 17 but is otherwise as described above. The cover 17 is moveably mounted on the connector housing 11 to cover and uncover the second opening 15. For example, the cover 17 may be pivotably mounted on a pivot 18 defined on the connector housing 11 to allow the cover 17 to be rotably move at the desired position to cover the second opening 15. However, the cover 17 may be brought to the desired position for covering the second opening 15 in other ways. For example, the cover 17 may be hingely connected on the pivot 18, so that it can be flipably move to the desired position. Alternatively, the cover 17 may be slideably move to the desired position for covering the second opening 15. The cover 17 comprises a sealing member, which is configured to seal the second opening 15, when the cover 17 is secured on the second opening 15, Insertion of the secondary locking device 13 into the connector 1 comprises pressing the secondary locking device 13 into the receiving space 12 and coupling the secondary locking device 13 to the housing 11. To perform this assembly, first the secondary locking device 13 must be positioned and orientated to receive the ribs 113 of the housing 11 into the slots 135. The secondary locking device 13 is then slid into the receiving space 12 pressing the pre-lock catch 134*a* past the surrounding edge 114*a* and into the pre-lock receptacle 114. The connector 1 is now assembled and the coupled secondary locking device 13 is then in the pre-locked condition.

Figure 5A:
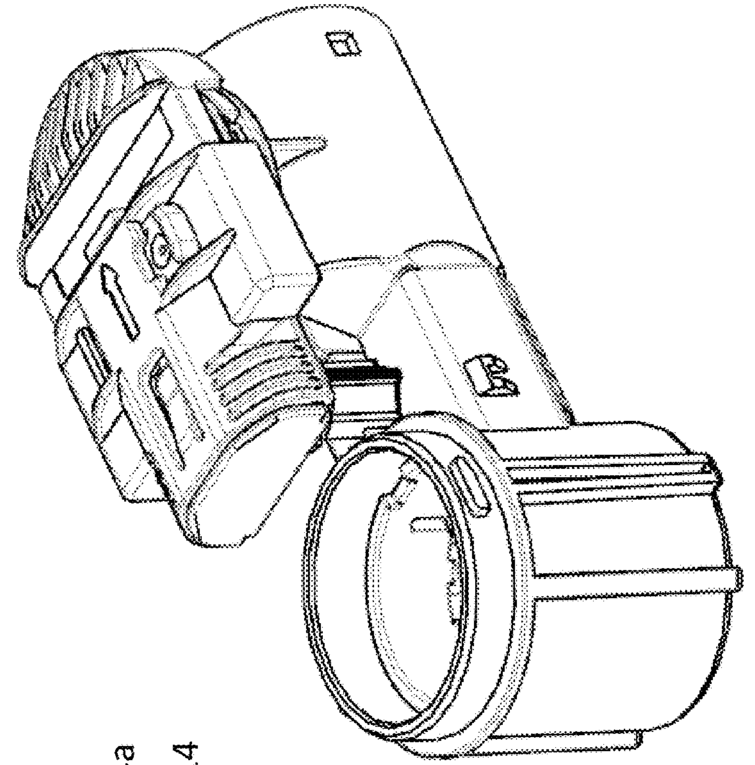
FIG. 5*a* shows the connector of FIG. 4 after assembly of the connector.
Figure 5B:
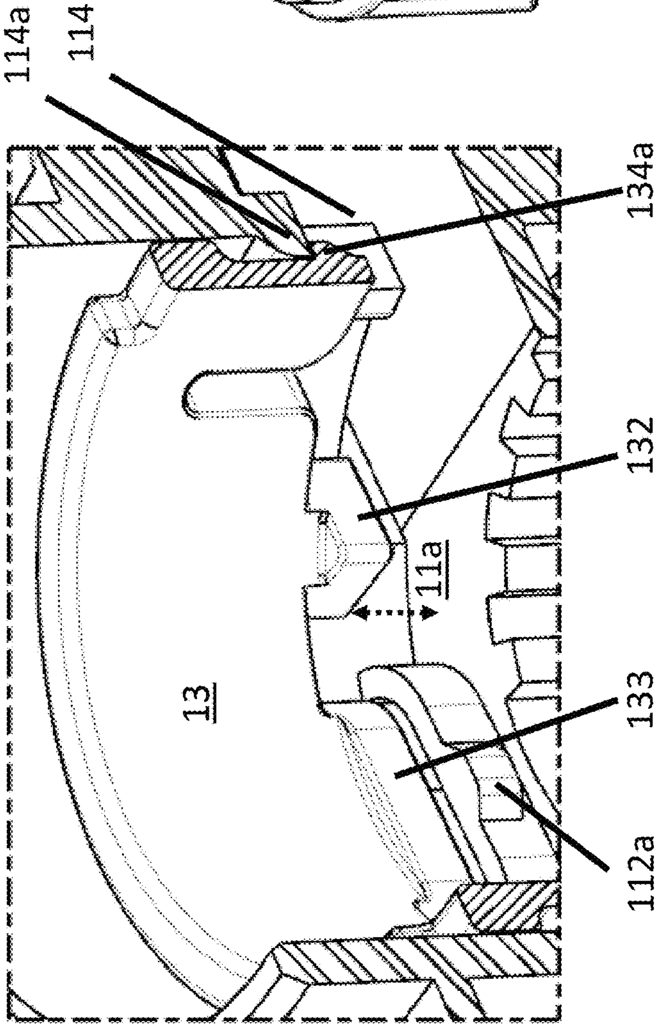
FIG. 5*b* shows a sectioned view of the connector in FIG. 5*a* showing the coupling of the secondary locking device to a housing of the connector.

FIGS. 5*a* and 5*b* show the assembled connector 1 with a secondary locking device 13 in the pre-locked condition. In the pre-locked condition, the secondary locking device 13 can still slide over a range of motion indicated by the dotted arrowed line in FIG. 5*b*. The lower limit is when the multiple protrusion are brought down into contact with the housing (the dotted arrowed line would have zero length in this contacting state). The upper limit of the range is when the pre-lock catch 134*a* contacts the surrounding edge 114*a* of the pre-lock receptacle 114. This upper limit represents the greatest separation between the multiple protrusions and a surface of the housing 11. The secondary locking device 13 is shown at the upper limit in FIG. 5*b*. When the secondary locking device 13 is at the upper limit the blocking protrusions 132*b* are separated from the catch voids 112*b* and do not interfere with the operation of the housing catches 112*a*. When the secondary locking device 13 is at the upper limit, the engaging protrusions 132*a* are also sufficiently far removed from the housing surface 11*a* that they will not interfere with a first electrical terminal 2 moving into, or out of, the defined position.

Figure 6:
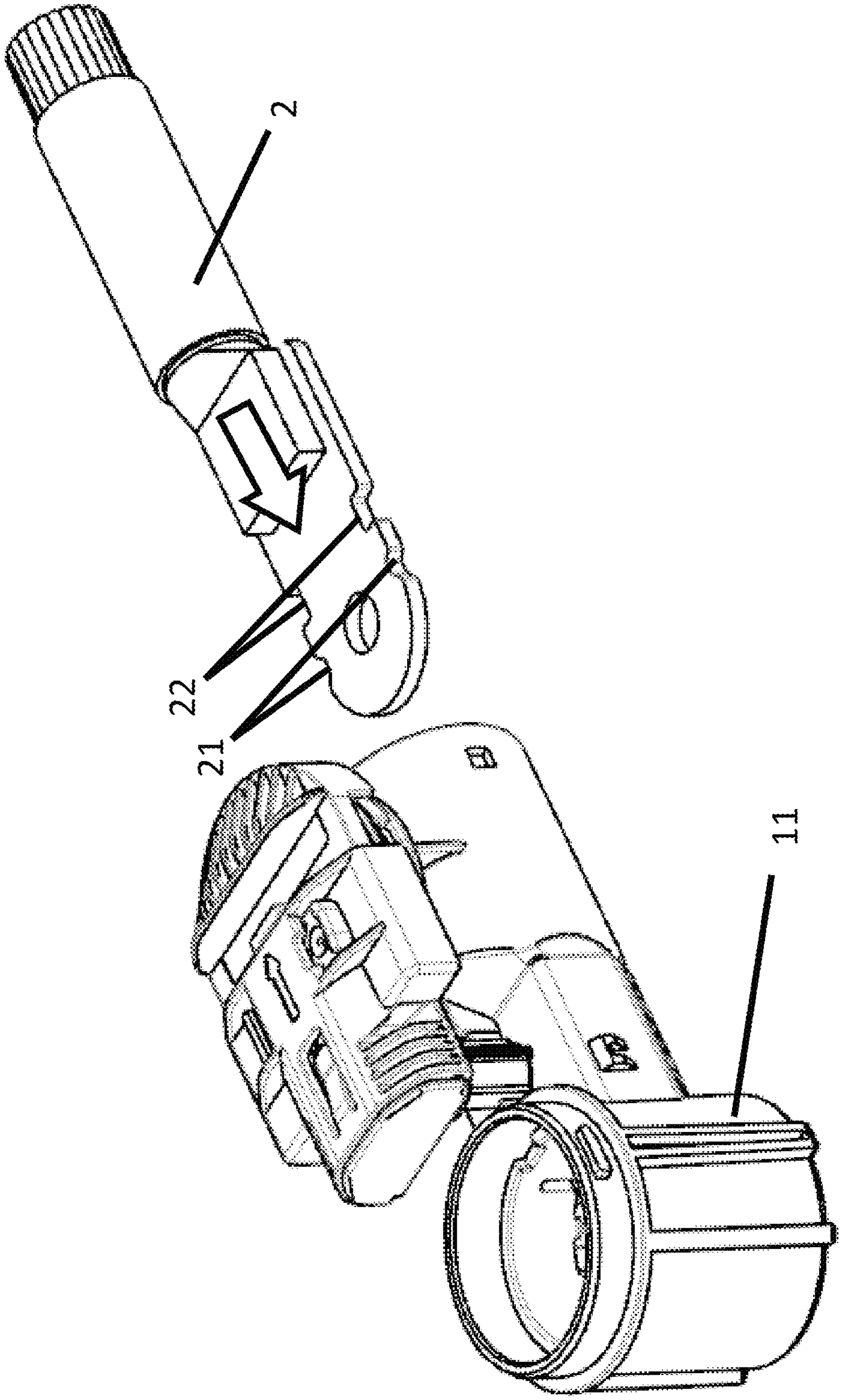
FIG. 6 shows an electrical terminal being inserted in the connector of FIG. 5*a;*

FIG. 6 shows a first electrical terminal 2 being inserted into the assembled connector 1. The first electrical terminal 2 is in the form of a ring terminal with primary notches 21 and secondary notches 22.

Figure 7A:
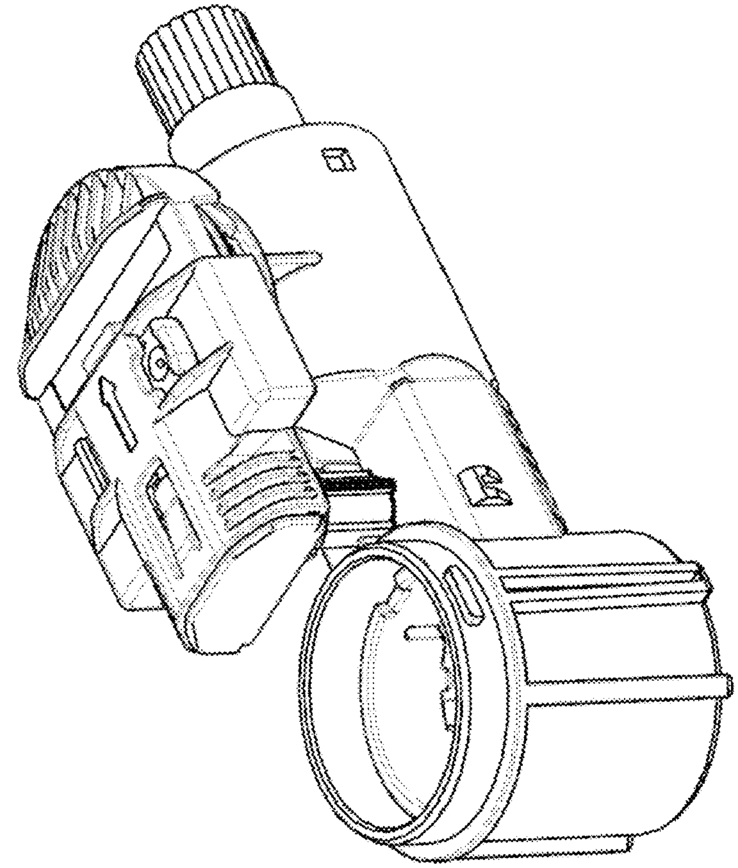
FIG. 7*a* shows the resultant connector after insertion of the electrical terminal.
Figure 7B:
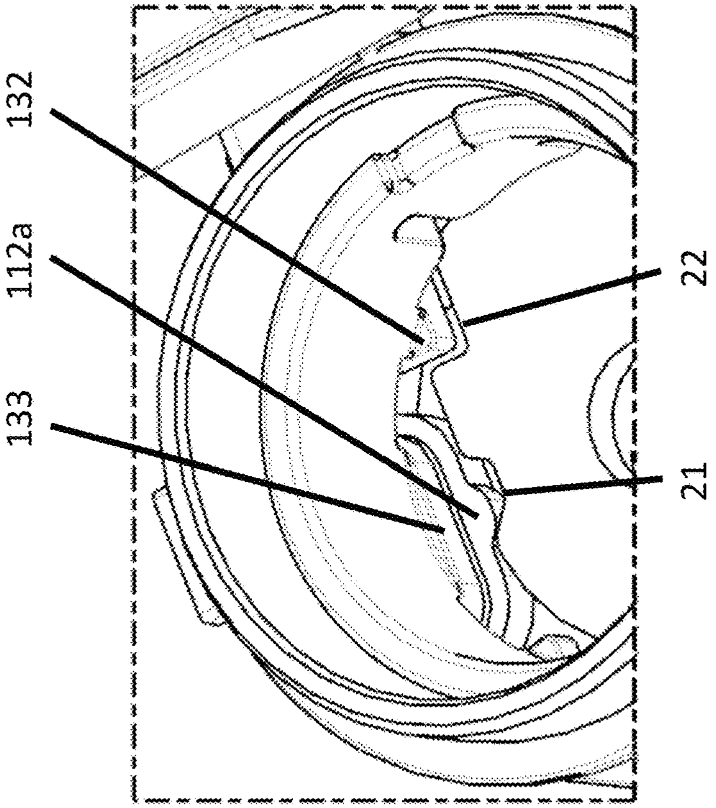
FIG. 7*b* shows a view of the connector in FIG. 7*a* showing the electrical terminal secured in a defined position.

FIGS. 7*a* and 7*b* show the assembled connector 1 with a secondary locking device 13 in the pre-locked condition and the ring terminal inserted into the defined position.

As noted above, the engaging protrusions 132*a* and blocking protrusions 132*b* of the secondary locking device 13 do not affect the moving of the ring terminal into the defined position. The housing catches 112*a* do however need to be pressed out of their biased position until the ring terminal is sufficiently positioned that the housing catches 112*a* can move into the primary 21 notches. Once the housing catches 112*a* move into the primary 21 notches, the biasing of the housing catches 112*a* forms a blocking configuration that prevents the ring terminal from moving out of the defined position. The defined position need not be a single position and a limited range of positions can be considered as a defined position. The range being set by manufacturing tolerances and the precision in positioning of the first electrical terminal that is required. For first electrical terminal without primary notches, the housing catches 112*a* retain the first electrical terminal through friction due by pressing against the first electrical terminal. Primary notches are therefore not essential and merely assist in ensuring the first electrical terminal is in the defined position.

Figure 8:
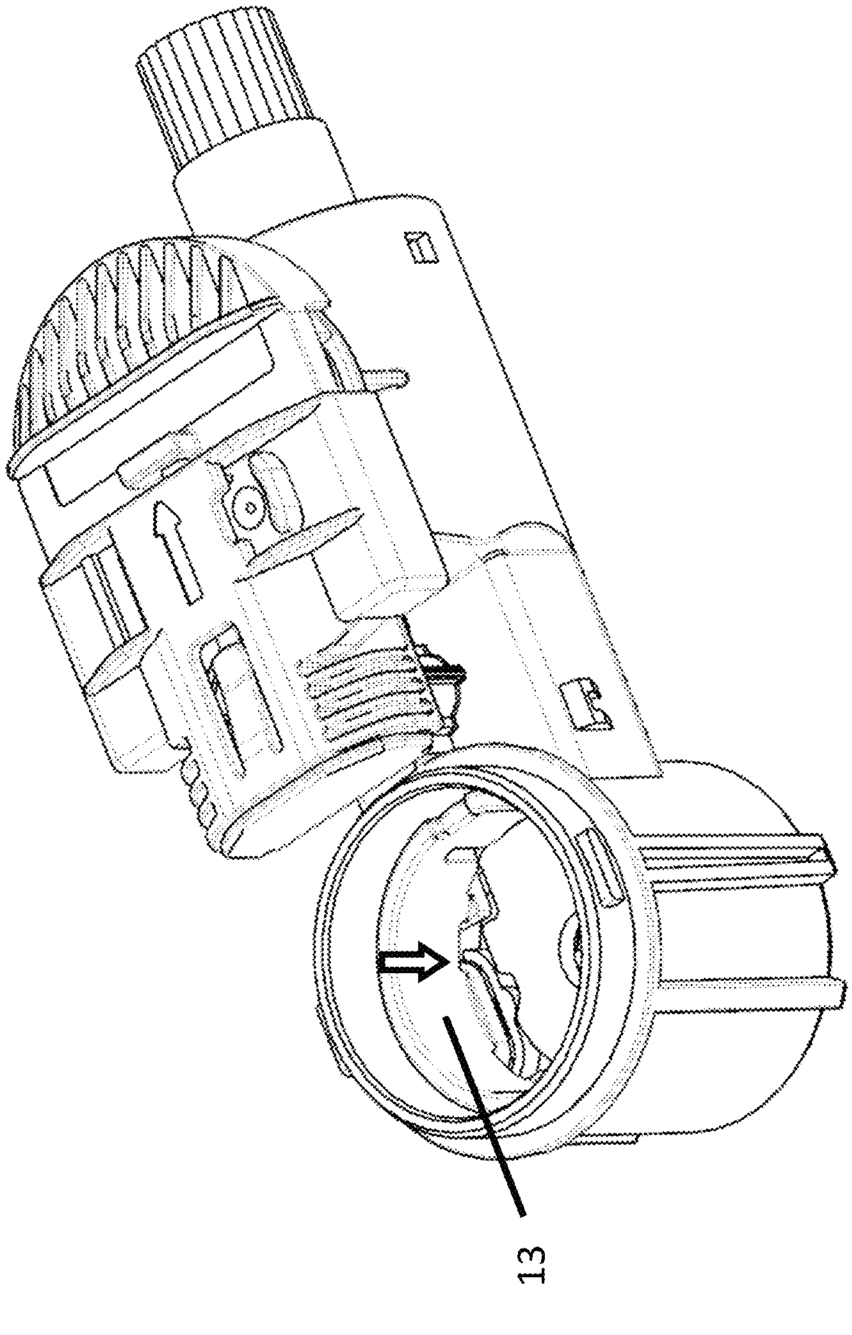
FIG. 8 shows the locking device being moved to a locked condition after the electrical terminal has been secured in the defined position.

FIG. 8 shows the connector with a ring terminal in the defined position and the secondary locking device being transitioned from the pre-locked condition into the locked condition.

Figure 9A:
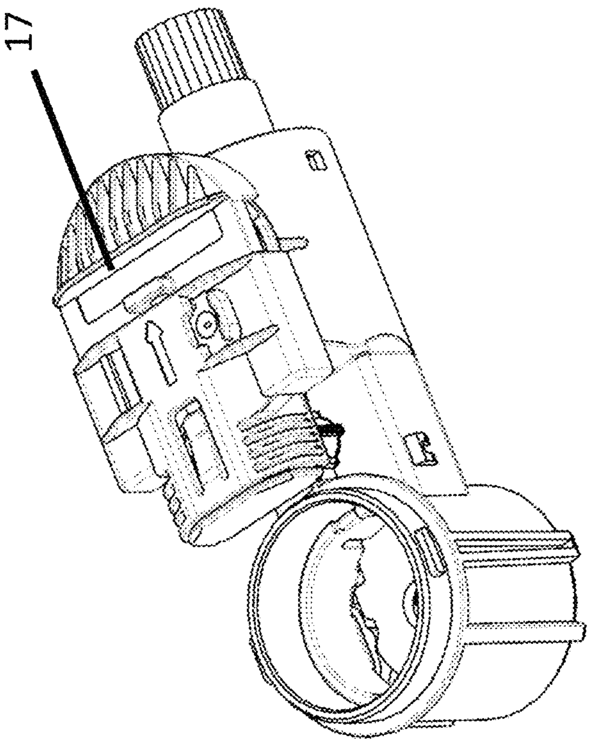
FIG. 9*a* shows the connector with the locking device in a final locked condition.
Figure 9B:
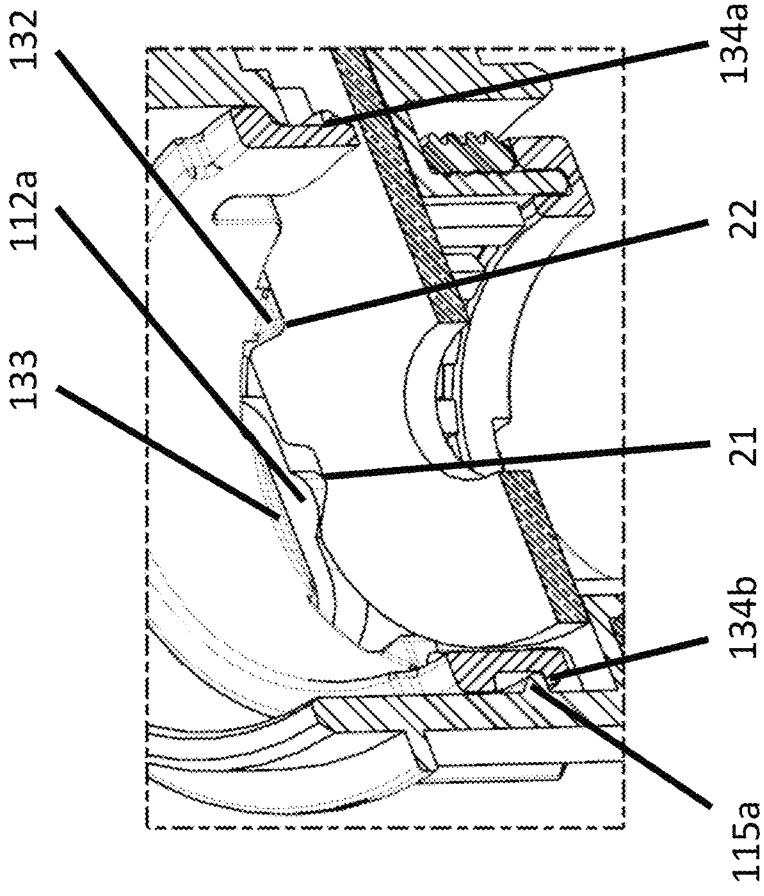
FIG. 9*b* shows a sectional view of the connector in FIG. 9*a* showing how the secondary locking device further secures the electrical terminal in the defined position.

FIGS. 9*a* and 9*b* show the assembled connector 1 with a secondary locking device 13 in the locked condition and the ring terminal inserted in the defined position. The engaging protrusions 132*a* have moved into the secondary notches 22 blocking the ring terminal from moving out of the defined position. The blocking protrusions 132*b* have also been moved into the catch voids 112*b* preventing the housing catches 112*a* from moving out of the blocking configuration. Therefore, blocking protrusions 132*b* and housing catches 112*a* cooperate to block the ring terminal from moving out of the defined position.

The locking condition is entered by sliding the secondary locking device 13 until the final catch 134*b* is pressed past the surrounding edge 115*a* and into the final receptacle 115. The final catch 134*b* is then retained in the final receptacle 115 retaining the secondary locking device 13 in the locked condition.

The secondary locking device for embodiments that work with first electrical terminal 2 without notches operates in a related but different manner. In these cases, the engaging protrusions press on the first electrical terminal 2 rather than being received in notches. As explained above, the primary locking device may operate with first electrical terminal 2 without notches by pressing against the electrical terminal 2. In these cases, pressing the blocking protrusions into the catch voids 112*b* serves to increase the pressing force from the housing catches 112*a*.

For all described embodiments, components of the connector may be chamfered, filleted, or adjusted in known ways to assist manufacturing and movement of pieces, and to ensure the required operational forces are met.

An unlocking tool can be used to overcome the final catch 134*b* and transition the device out of the locked condition. This is useful for disassembly and in case the secondary locking device 13 is accidentally moved into the locked condition before a first electrical terminal 2 has been inserted.

While the electrical connector of the present disclosure has been described in terms of the preferred embodiments thereof, it is not intended to be so limited, but rather only to the extent set forth in the claims that follow.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. An electrical connector, comprising:

a housing defining:
- a receiving space, and
- a first opening, in communication with the receiving space, for receiving a first electrical terminal;

a primary locking device configured to secure the first electrical terminal at a defined position within the receiving space;

a secondary locking device comprising one or more locking elements;

wherein the secondary locking device is mounted within the receiving space and configured to be moveable between a pre-locked condition and a locked condition;

wherein, when the secondary locking device is moved to the locked condition and the first electrical terminal is secured in the defined position by the primary locking device, the one or more locking elements of the secondary locking device are configured to lock the first electrical terminal in the defined position;

wherein the one or more locking elements comprise one or more blocking protrusions;

wherein the primary locking device is biased in a blocking configuration that retains the first electrical terminal in the defined position; and wherein the secondary locking device is configured so that, when the secondary locking device is in the locked condition, the one or more blocking protrusions engage the primary locking device to maintain the primary locking device in the blocking configuration.

2. The electrical connector of claim 1, wherein the one or more locking elements comprise one or more engaging protrusions that are configured, when the secondary locking device is in the locked condition and the first electrical terminal is in the defined position, to engage with the first electrical terminal.

3. The electrical connector of claim 1, wherein:

the secondary locking device comprises a pre-lock catch and the housing comprises a pre-lock receptacle; and the pre-lock catch and the pre-lock receptacle are configured to engage to retain the secondary locking device in the pre-locked condition.

4. The electrical connector of claim 1, comprising one or more guiding features configured to limit possible motion of the secondary locking device to a non-rotating translation.

5. The electrical connector of claim 4, wherein the one or more guiding features comprise a rib on the housing and a slot in the secondary locking device that receives the rib.

6. The electrical connector of claim 1, wherein:
the secondary locking device comprises a final catch and the housing comprises a final receptacle; and
the final catch and the final receptacle are configured to engage to retain the secondary locking device in the locked condition.

7. The electrical connector of claim 1, wherein the secondary locking device defines a cylinder, the cylinder having a first end and a second end opposite the first end, the first end being configured to engage with the first electrical terminal and the second end comprising a feature to indicate a rotational alignment of the secondary locking device.

8. The electrical connector of claim 1, wherein the first electrical terminal is a ring terminal.

9. The electrical connector of claim 1, wherein the electrical connector is configured for automotive use and/or an operational voltage of 48 volts.

10. The electrical connector of claim 1, comprising a cover configured to engage with the housing and at least partially seal the receiving space.

11. The electrical connector of claim 1, wherein:
the secondary locking device defines a cylinder with an axis of rotation, and
the secondary locking device is symmetric in two orthogonal planes, the axis of rotation being parallel to both planes.

12. The electrical connector of claim 1, wherein the electrical connector is an angled connector assembly having an angle of 45° to 135°.

13. The electrical connector of claim 1, wherein the housing comprises a first portion and a second portion positioned at an angle to one another.

14. The electrical connector of claim 13, wherein the first portion is positioned perpendicular to the second portion.

15. The electrical connector of claim 13, wherein the first portion defines the first opening and the second portion defines, at opposing ends, a second opening and a third opening, the first, second, and third openings being in communication with a receiving space of the housing.

16. The electrical connector of claim 15, wherein the third opening of the housing is arranged to allow access to an electrical terminal being arranged within the receiving space of the housing.

17. The electrical connector of claim 16, wherein the electrical connector is a female electrical connector configured to receive though the third opening an electrical terminal of a counter electrical connector to facilitate coupling with the electrical terminal arranged within the receiving space of the housing.

18. The electrical connector of claim 15, wherein the first and second portions of the housing are cylindrical such that each of the first, second and third openings is a circular opening.

19. The electrical connector of claim 18, comprising a cover configured to engage with the housing and at least partially seal the receiving space, wherein the cover comprises a circular portion configured to sealingly cover the second opening.

20. An electrical connector assembly, comprising:
the electrical connector according to claim 1; and
a first electrical terminal secured in a defined position within the receiving space of the electrical connector by the primary locking device;
wherein, when the secondary locking device is moved from the pre-locked condition to the locked condition, one or more locking elements of the secondary locking device are configured to cooperate with corresponding engagement features of the first electrical terminal to lock the first electrical terminal in the defined position.

21. A method of locking a first electrical terminal at a defined position within an electrical connector, the method comprising:
retaining a secondary locking device in a pre-locked condition within a receiving space defined by a housing of the electrical connector;
receiving the first electrical terminal into the receiving space through a first opening in the housing;
engaging a primary locking device on the housing with the first electrical terminal to secure the first electrical terminal at a defined position;
moving the secondary locking device from the pre-locked condition to a locked condition so that one or more locking elements of the secondary locking device lock the first electrical terminal in the defined position;
securing the secondary locking device in the locked condition, wherein the primary locking device is biased in a blocking configuration that retains the first electrical terminal in the defined position; and
moving the secondary locking device from the pre-locked condition to the locked condition comprises engaging the primary locking device with one or more blocking protrusion on the secondary locking device to prevent the primary locking device transitioning from the blocking configuration.

22. The method of claim 21, wherein moving the secondary locking device from the pre-locked condition to the locked condition comprises:
engaging one or more engaging protrusions on the secondary locking device with the first electrical terminal.

23. The method of claim 21, wherein retaining the secondary locking device in the pre-locked condition within a receiving space comprises a step of pressing a pre-lock catch of the secondary locking device past a pre-lock receptacle of the housing.

24. The method of claim 21, wherein securing the secondary locking device comprises a step of pressing a final catch of the secondary locking device past a final receptacle of the housing.

* * * * *